(12) United States Patent
Moteki et al.

(10) Patent No.: US 7,798,491 B2
(45) Date of Patent: Sep. 21, 2010

(54) SHEET CONVEYING APPARATUS AND IMAGE FORMING APPARATUS

(75) Inventors: Junichi Moteki, Abiko (JP); Takashi Fujita, Kashiwa (JP); Hiroaki Takagishi, Tokyo (JP); Nobuto Kamiyama, Kashiwa (JP); Seiichiro Kameda, Abiko (JP); Youichi Chikugo, Toride (JP); Satohisa Tateishi, Abiko (JP); Kozo Inoue, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/835,327

(22) Filed: Aug. 7, 2007

(65) Prior Publication Data

US 2008/0036137 A1 Feb. 14, 2008

(30) Foreign Application Priority Data

Aug. 8, 2006 (JP) .............................. 2006-216094

(51) Int. Cl.
*B65H 9/04* (2006.01)
(52) U.S. Cl. .................. 271/242; 271/227; 271/228; 271/188
(58) Field of Classification Search ................. 271/227, 271/228, 188, 242
See application file for complete search history.

(56) References Cited

U.S. PATENT DOCUMENTS

| | | | | |
|---|---|---|---|---|
| 5,115,322 A * | 5/1992 | Jang | ............................. | 358/304 |
| 5,156,391 A * | 10/1992 | Roller | ......................... | 271/227 |
| 5,246,224 A * | 9/1993 | Matsuno et al. | .............. | 271/242 |
| 5,543,909 A * | 8/1996 | Quesnel | ....................... | 399/394 |
| 5,681,036 A * | 10/1997 | Wakahara et al. | ......... | 271/10.12 |
| 5,904,350 A * | 5/1999 | Creighton et al. | ............ | 271/227 |
| 5,933,697 A * | 8/1999 | Onodera et al. | .............. | 399/406 |
| 6,059,285 A * | 5/2000 | Suga et al. | ................... | 271/228 |
| 6,102,392 A * | 8/2000 | Gleichauf et al. | ....... | 271/265.02 |
| 6,273,418 B1 | 8/2001 | Fujikura | | |
| 6,356,735 B1 * | 3/2002 | Hozumi | ...................... | 399/395 |
| 6,488,275 B2 * | 12/2002 | Schlageter | ................ | 271/10.01 |
| 6,974,128 B2 * | 12/2005 | Quesnel | ........................ | 271/227 |
| 7,434,802 B2 * | 10/2008 | Yamamoto | ................... | 271/188 |
| 7,467,793 B2 * | 12/2008 | Tanabe | ......................... | 271/245 |
| 7,527,263 B2 * | 5/2009 | DeGruchy et al. | ........... | 271/242 |
| 2004/0094892 A1* | 5/2004 | Kuramoto | ..................... | 271/227 |
| 2004/0239027 A1* | 12/2004 | Trovinger et al. | ............ | 271/227 |
| 2006/0022400 A1* | 2/2006 | Kawasaki et al. | ............ | 271/227 |
| 2007/0023995 A1* | 2/2007 | Onodera | ...................... | 271/226 |

* cited by examiner

*Primary Examiner*—Patrick Mackey
*Assistant Examiner*—Prasad V Gokhale
(74) *Attorney, Agent, or Firm*—Canon USA Inc IP Div

(57) ABSTRACT

A registration unit includes a skew correction roller pair configured to rotate a sheet conveyed from a conveyance roller pair and to correct skew of the sheet. The registration unit sheet further includes a projectable swinging guide arranged between the conveyance roller pair and the skew correction roller pair to deflect the sheet. The skew correction roller pair corrects the skew of the sheet deflected by the swinging guide.

2 Claims, 6 Drawing Sheets

SHEET CONVEYING APPARATUS AND IMAGE FORMING APPARATUS

BACKGROUND OF THE INVENTION

1. Field of the Invention

The present invention relates to a sheet conveying apparatus configured to convey a sheet while correcting skew of the sheet and an image forming apparatus configured to form an image on the sheet having the skew corrected, which includes the sheet conveying apparatus.

2. Description of the Related Art

Conventionally, electrophotography, offset printing, and inkjet printing are used in an image forming apparatus when forming an image on a sheet.

A color image forming apparatus using electrophotographic technology can be classified into a tandem-type color image forming system and a rotary-type color image forming system. The tandem-type color image forming system includes a plurality of image forming stations arranged in tandem while the rotary-type color image forming system includes a plurality of image forming stations arranged cylindrically. Further, the image forming apparatus can be classified according to a transfer system. In a direct transfer system, a toner image is directly transferred from a photosensitive drum onto a sheet. In an intermediate transfer system, a toner image is transferred once onto an intermediate transfer member before it is transferred onto a sheet.

A color image forming apparatus employs the intermediate transfer system having the tandem configuration in which four image forming stations that correspond to four colors are arranged along an intermediate transfer belt. In recent years, this type of color image forming apparatus has been introduced as a print on demand (POD) system aiming at a printing market of a small number of copies because such a system does not require a printing plate in forming an image on a sheet. However, high quality image output is required when the color image forming apparatus enters such a convenience printing market. In order to achieve the high quality, precise image forming registration (accuracy of transfer position of the image on a sheet) becomes important. Further, an image needs to be formed on a variety of sheets having different thickness. For example, an image needs to be formed on thin paper having approximate grammage of less than 50 g/m$^2$.

Accuracy of image forming position is determined by factors such as registration in a sheet conveyance direction, registration in a direction orthogonal to the sheet conveyance, magnification, amount of skew, etc.

It is difficult to decrease an amount of skew by electrically correcting the skew. For example, it is certainly possible to detect skew, form an inclined image that corresponds to the skew, and form an image in a normal position. However, in a case of a color image forming apparatus that lays three or four colors to form an image, if the image is to be inclined in each sheet, dot forming of each color shows misregistration so that color tone varies on each sheet. Further, since time is required to calculate the amount of inclination of the image, productivity is greatly decreased.

Therefore, it is useful to eliminate skew by improving sheet conveying accuracy of a sheet conveying apparatus which conveys a sheet to a transfer unit that transfers a toner image onto the sheet.

The sheet conveying apparatus can employ the following three systems to improve the sheet conveying accuracy.

A first system employs a registration roller pair. In this system, the registration roller pair is arranged upstream of a transfer unit adapted to transfer a toner image onto a sheet. When the sheet is conveyed, the registration roller pair stops rotating and a leading edge of a sheet conveyed from the upstream is held at a nip of the registration roller pair. Since the sheet continues to be conveyed, the sheet deflects and skew is corrected. When the skew is corrected, the registration roller pair starts rotating and the sheet is conveyed in synchronization with the toner image. In this way, a toner image is formed on the skew-corrected sheet.

A second system employs a reference wall formed along a sheet conveyance direction and a skewed roller that causes the side edge of a sheet to hit the reference wall. The second system is described in U.S. Pat. No. 6,273,418. In this system, the sheet is guided to abut the reference wall by the skewed roller to correct the skew. Subsequently, a leading edge of the sheet is detected by a sensor and a conveyance speed of the sheet is controlled based on this detection. Thus, the sheet and the toner image are aligned, and a toner image is formed on the sheet in an appropriate position.

A third system employs two skew correction roller pairs. This system is described in U.S. Pat. No. 5,156,391. In this system, two skew correction roller pairs 426, 424 and 427, 425 are arranged in a direction orthogonal to the sheet conveyance direction as shown in FIG. 6A. The skew correction roller pairs 426, 424 and 427, 425 nip the sheet P while rotating independently to convey the sheet P. Conveyance roller pairs 436, 434 and 437, 435 which are arranged upstream of the two skew correction roller pairs, convey the sheet P to the skew correction roller pairs 426, 424 and 427, 425. Sensors 496 and 497, which are arranged downstream of the two skew correction roller pairs 426, 424 and 427, 425, detect an amount of skew of the sheet P.

Based on the amount of skew detected by the sensors 496 and 497, a conveyance speed of the skew correction roller pairs 426, 424 and 427, 425 is controlled so that the sheet P is rotated and the skew is corrected.

At the time the skew correction roller pairs 426, 424 and 427, 425 rotate the sheet P, if the conveyance roller pairs 436, 434 and 437, 435 arranged upstream of the two skew correction roller pairs nip the sheet P, the sheet P cannot be rotated. Therefore, as shown in FIG. 6B, before the skew correction roller pairs 426, 424 and 427, 425 rotate the sheet P, the skew correction roller pairs 426, 424 and 427, 425 slow down rotation speeds so that a deflection Pa of the sheet P is formed between the skew correction roller pairs 426, 424 and 427, 425 and the conveyance roller pairs 436, 434 and 437, 435. With this deflection Pa, a twist of the sheet P formed during its rotation can be allowed. Accordingly, the sheet P is rotated reliably and the skew can be corrected with improved accuracy.

However, in a sheet conveying apparatus employing the first or the second system, since the skew is corrected by using a stiffness of the sheet, it is difficult to correct skew of a thin sheet. That is, when a thin sheet abuts a nip of the registration roller pair or when a side edge of the sheet abuts the reference wall, the sheet is bent, which results in creases. Consequently, the skew cannot be reliably corrected.

A sheet conveying apparatus employing the third configuration forms a deflection by slowing down the skew correction roller pairs while the sheet is nipped by the skew correction roller pairs and the conveyance roller pairs. The deflection of the sheet is formed before the skew is corrected by the skew correction roller pairs. Accordingly, the conveyance speed of the sheet becomes slower when the sheet is deflected. Consequently, productivity (number of sheets output with an image formed in a certain period of time) is reduced.

Additionally, when in an attempt to reduce the size of such an image forming apparatus, a sensor which detects the amount of skew is placed upstream of the skew correction roller pairs so that the skew is corrected by the skew correction roller pairs directly after the amount of skew is detected, the following problem arises. Namely, in this case, the skew cannot be corrected until a deflection is formed between the skew correction roller pairs and the conveyance roller pairs. Accordingly, while the deflection is being formed, the sheet proceeds downstream so that a longer section (section L, see FIG. 6B) needs to be formed downstream of the skew correction roller pairs to correct the skew, and a longer space is required between the skew correction roller pairs and a transfer unit located downstream of the skew correction roller pairs. Therefore, the apparatus cannot be sufficiently downsized.

As described above, the conventional sheet conveying apparatus employing the third configuration has a problem in productivity as well as downsizing since an image forming apparatus having such sheet conveying apparatus requires a longer space between the skew correction roller pairs and apparatuses located downstream of the skew correction roller pairs.

SUMMARY OF THE INVENTION

The present invention is directed to a sheet conveying apparatus which contributes to downsizing an image forming apparatus without reducing productivity.

According to an aspect of the present invention, a sheet conveying apparatus includes a conveying device configured to convey a sheet along a sheet path, a skew correcting device configured to correct the skew of the sheet by rotating the sheet which is conveyed along the sheet path by the conveying device, and a deflection forming device which is arranged between the sheet conveying device and the skew correcting device and operable to project into the sheet path to form deflection of the sheet. The skew of the sheet is corrected by the skew correcting device while the deflection of the sheet is formed by the deflection forming device.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3A illustrates the registration unit when the sheet is conveyed to the registration unit. FIG. 3B illustrates the registration unit that corrects a skew of a deflected sheet while being conveyed.

DETAILED DESCRIPTION OF THE EMBODIMENTS

Various exemplary embodiments, features, and aspects of the invention will be described in detail below with reference to the drawings.

Figure 1:
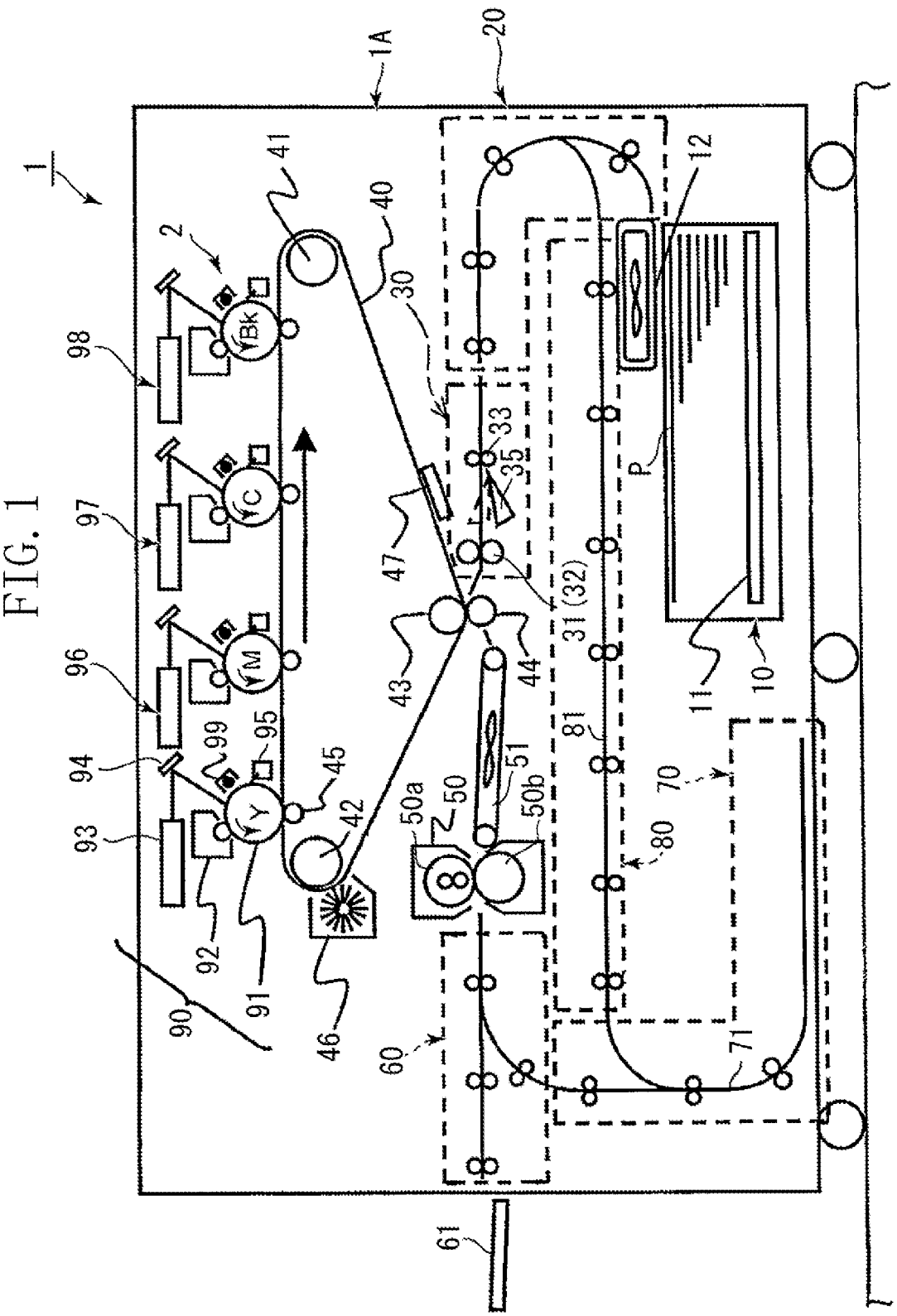
FIG. 1 is a cross-sectional view of an image forming apparatus taken in a sheet conveyance direction according to an exemplary embodiment of the present invention.

FIG. 1 is a cross-sectional view of an image forming apparatus 1 taken in a sheet conveyance direction according to an exemplary embodiment of the present invention. The image forming apparatus 1 forms an image on a sheet. If a sheet is skewed before an image is formed, the image forming apparatus 1 corrects the skew by a registration unit 30 that serves as a sheet conveying apparatus, and conveys the skew-corrected sheet to an image forming unit 2 where the image is formed. The image forming apparatus 1 can be a printer, a fax machine, a copying machine, or a multifunction peripheral having all such functions.

The image forming apparatus 1 has, in an apparatus body 1A, the image forming unit 2 including four image forming stations, an intermediate transfer belt 40, and a secondary transfer outer roller 44.

The four image forming stations illustrated in FIG. 1 are a yellow station 90, a magenta station 96, a cyan station 97, and a black station 98 in order from left to right. A toner image corresponding to each color that is subsequently transferred to the intermediate transfer belt 40 is formed at each station. Since the four image forming stations have the same configuration, only a configuration of the yellow station 90 will be described, and description regarding other stations will be omitted.

A scanner unit 93 converts image information sent from apparatuses such as an image scanning unit, a personal computer, or a server (all of which are not shown) into a laser beam that is emitted by a laser emission unit (not shown). The laser beam is directed to a polygonal mirror (not shown) where the laser beam is scanned laterally. The laser beam is then emitted from the scanner unit 93 in order to scan a photosensitive drum 91 along a predetermined generatrix of the drum 91 by a folding mirror 94.

Upstream of a position where the drum is eradiated with the laser beam, a charging unit 99 is placed. The charging unit 99 provides uniform negative electrical charges on the photosensitive drum 91. An area on the photosensitive drum 91 that was exposed to the laser beam loses the electrical charges since the photosensitive drum 91 is coated with a photoconductive film. By repeating this process, an electronic image (latent image) is formed on the surface of the photosensitive drum 91. In other words, electrical charges on the drum 91 are lost except for the area of the latent image, and only the area of the latent image is charged negative. Then the photosensitive drum 91 rotates so that the latent image faces a developing unit 92 that contains positively-charged toner. The positively-charged toner is attracted only to the area of the latent image. Consequently, the latent image is visualized as a toner image. It is to be noted that the polarity of the electric charges can be reversed depending on toner types; however, according to the present exemplary embodiment, the toner is charged positive. Also, a cleaner 95 is arranged downstream of the photosensitive drum 91. The cleaner 95 recovers toner which is left on the photosensitive drum 91.

Then, a transfer current is applied from the rotating photosensitive drum 91 to a transfer roller 45 through the circulating intermediate transfer belt 40. Accordingly, the toner image is uniformly transferred onto the intermediate transfer belt 40.

The image forming unit 2 separates the color of the scanned image into yellow, magenta, cyan, and black, and continuously multi-transfers the toner image from each image forming station onto the intermediate transfer belt 40. As a result, a color image is formed on the intermediate transfer belt 40.

The intermediate transfer belt 40 circulates around a drive roller 42 that drives the intermediate transfer belt, a steering roller 41 that controls the intermediate transfer belt, and a secondary transfer roller 43 that transfers the multi-transferred color image on the sheet.

A patch detection sensor 47 is located upstream of the secondary transfer roller 43. The patch detection sensor 47 detects color misregistration of the multi-transferred image and a leading edge of the image. Also, a cleaner 46 is arranged downstream of the secondary transfer roller 43. The cleaner 46 recovers toner which is left on the intermediate transfer belt 40.

The intermediate transfer belt 40 is pressed against the secondary transfer roller 43 under constant pressure by the secondary transfer outer roller 44. The transfer current is fed from the secondary transfer roller 43 to the secondary transfer outer roller 44 through the intermediate transfer belt 40.

A paper deck 10, which is detachably attached and stacks sheets P, is inserted into a lower part of the apparatus body 1A of the image forming apparatus 1. The paper deck 10 includes a conveying belt (not shown), a suction fan 12 adapted to attract the sheet to the conveying belt, and a paper detection sensor (not shown). The sheet P, which is suctioned by the suction fan 12 and attracted to the conveying belt, is conveyed downstream by the rotation of the conveying belt. According to the information sent from the paper detection sensor, a lifting plate 11 constantly rises to prevent paper feed failure or double feed. Double feed is also prevented by a flow of separation air blown into the paper deck in the sheet conveyance direction and also in the direction orthogonal to the sheet conveyance direction (width direction). After that, the sheet P is conveyed to a sheet conveying unit 20.

The sheet conveying unit 20, serving as a sheet conveying apparatus, conveys the sheet P to the registration unit 30. The registration unit 30 corrects the skew of the sheet P. Detailed configuration of the registration unit 30 will be described below.

The sheet P whose skew was corrected at the registration unit 30 is then conveyed to a transfer unit (nip) of the intermediate transfer belt 40 and the secondary transfer outer roller 44. At the transfer unit, the toner image is transferred onto the intermediate transfer belt 40. Then, the sheet P is conveyed to a fixing unit 50 by a conveying belt 51. When the sheet P passes through a fixing roller 50a and a pressure roller 50b, heat and pressure are applied to the sheet P, and the toner image is fixed. After the fixing process, if the image forming apparatus 1 is in an ordinary copy mode (one-sided copy mode), the sheet P is discharged to a stack tray 61 by a delivery unit 60 and stacked there.

The image forming apparatus 1 also has a two-sided copying mode in which a toner image is formed on both sides of the sheet P. When the image forming apparatus is in the two-sided printing mode, the sheet P is reversed by a reversing unit 70 at a switch-back path 71 after the sheet passes the fixing unit 50. Then the sheet P is conveyed through a sheet re-feeding path 81 of a sheet re-feeding unit 80 and conveyed again to the registration unit 30. The registration unit 30 corrects the skew of the sheet P, and the sheet P is conveyed to the image forming unit 2. After that, the sheet P goes through the same process as the one-sided printing, and the sheet P is conveyed and stacked in the stack tray 61 with a toner image formed on both sides.

Figure 2:
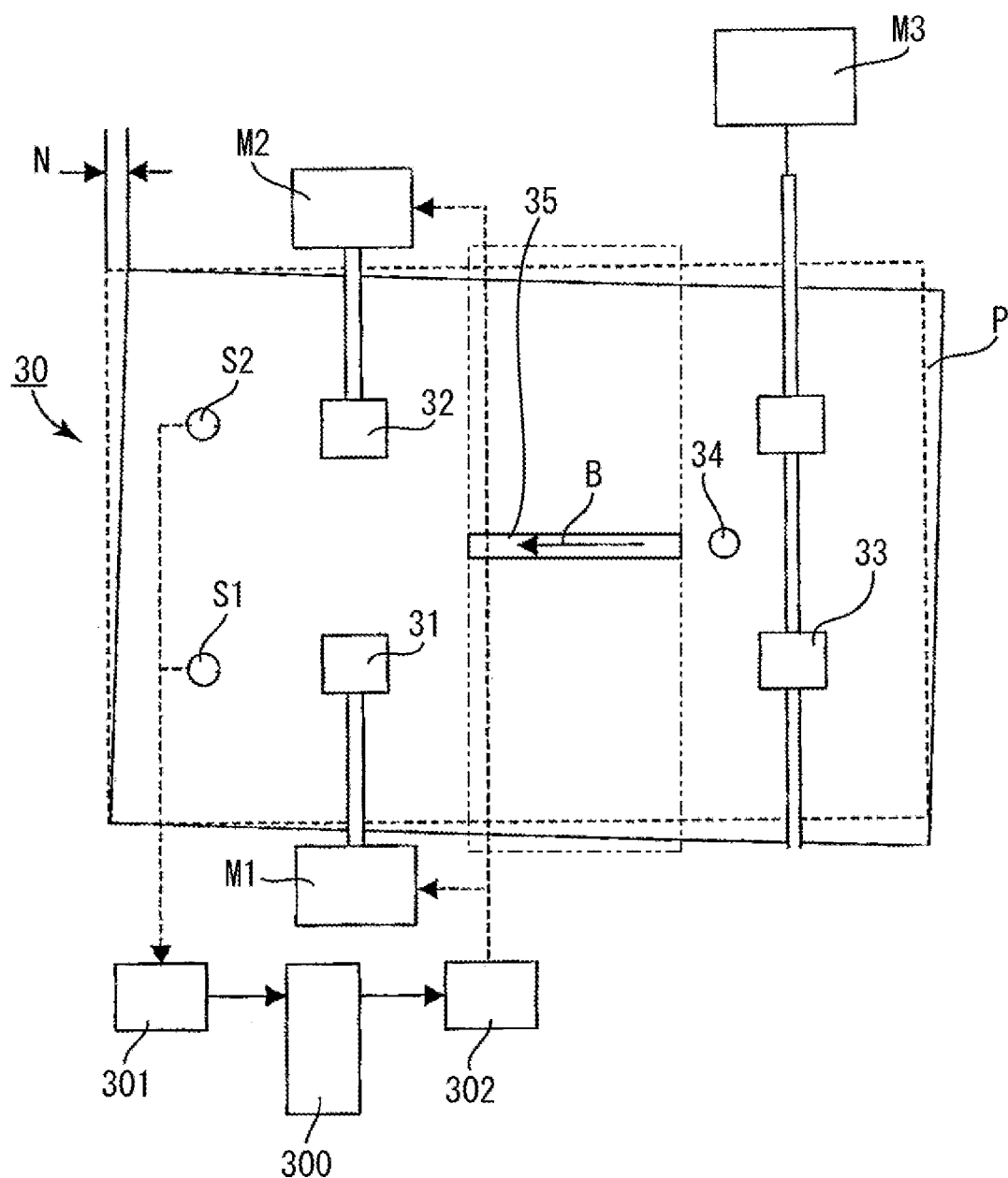
FIG. 2 is a plan view of a registration unit of the sheet conveying apparatus according to an exemplary embodiment of the present invention.
Figure 3A:
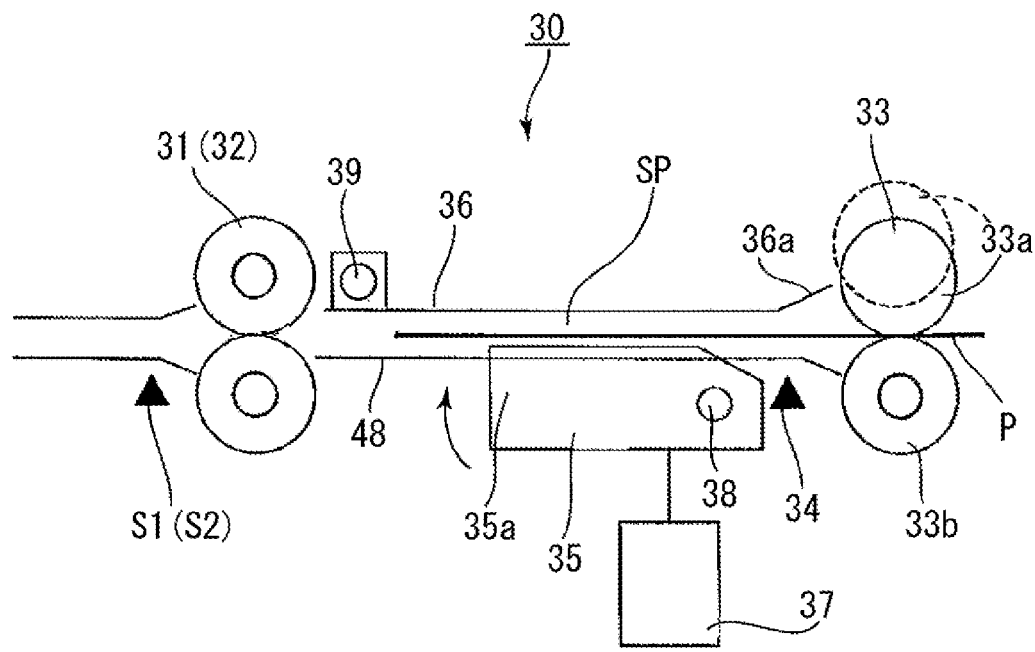
FIGS. 3A and 3B are cross-sectional views of the registration unit taken in the sheet conveyance direction according to an exemplary embodiment of the present invention.
Figure 3B:
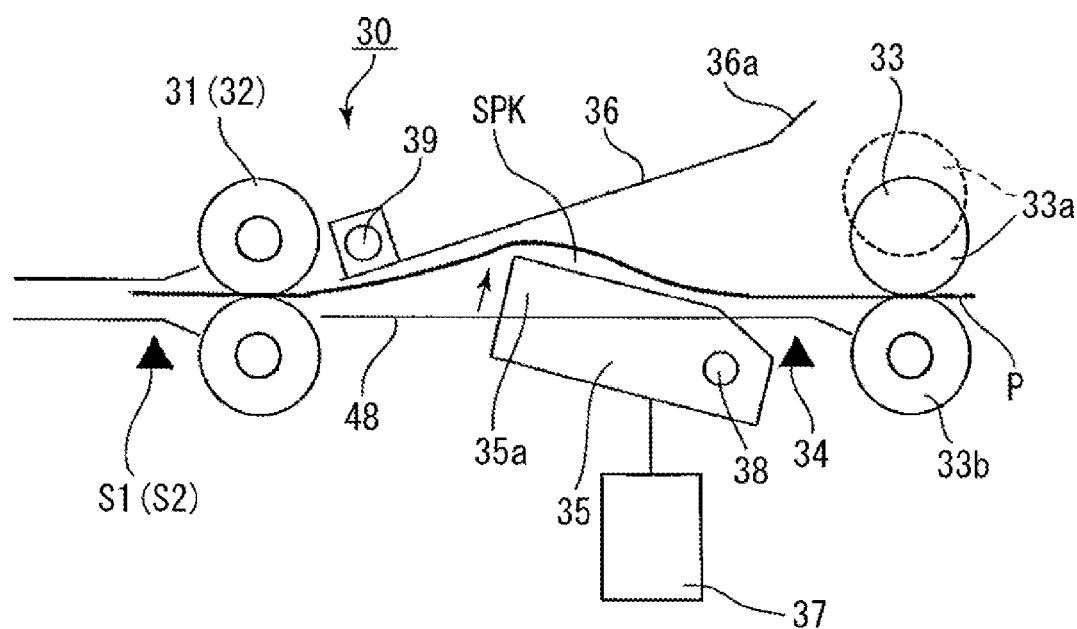

FIG. 2 is a plan view of the registration unit 30. FIG. 3A is a side view of the registration unit 30 when the sheet is conveyed to the registration unit. FIG. 3B is a side view of the registration unit 30 when the skew of a deflected sheet is corrected while the sheet is being conveyed.

Referring to FIGS. 2, 3A, and 3B, a skew correction roller pair 31, a skew correction roller pair 32, and a conveyance roller pair 33 are arranged in the registration unit 30. The sheet is conveyed in a direction of the arrow B by each of the roller pairs. A skew correction motor M1 arranged near the front side of the apparatus rotates the skew correction roller pairs 31, and a skew correction motor M2 arranged near the back side of the apparatus rotates the skew correction roller pairs 32. The skew correction roller pairs 31 and 32 and the skew correction motors M1 and M2 constitute the skew correcting device. Further, a conveying motor M3 rotates a drive roller 33b of the conveyance roller pair 33. Together with the conveyance roller pair 33, the conveying motor M3 constitutes the sheet conveying device. The skew correction roller pairs 31 and 32 and the conveyance roller pair 33 are controlled so that they rotate at a substantially same speed (roller rim speed) to convey the sheet.

Figure 4:
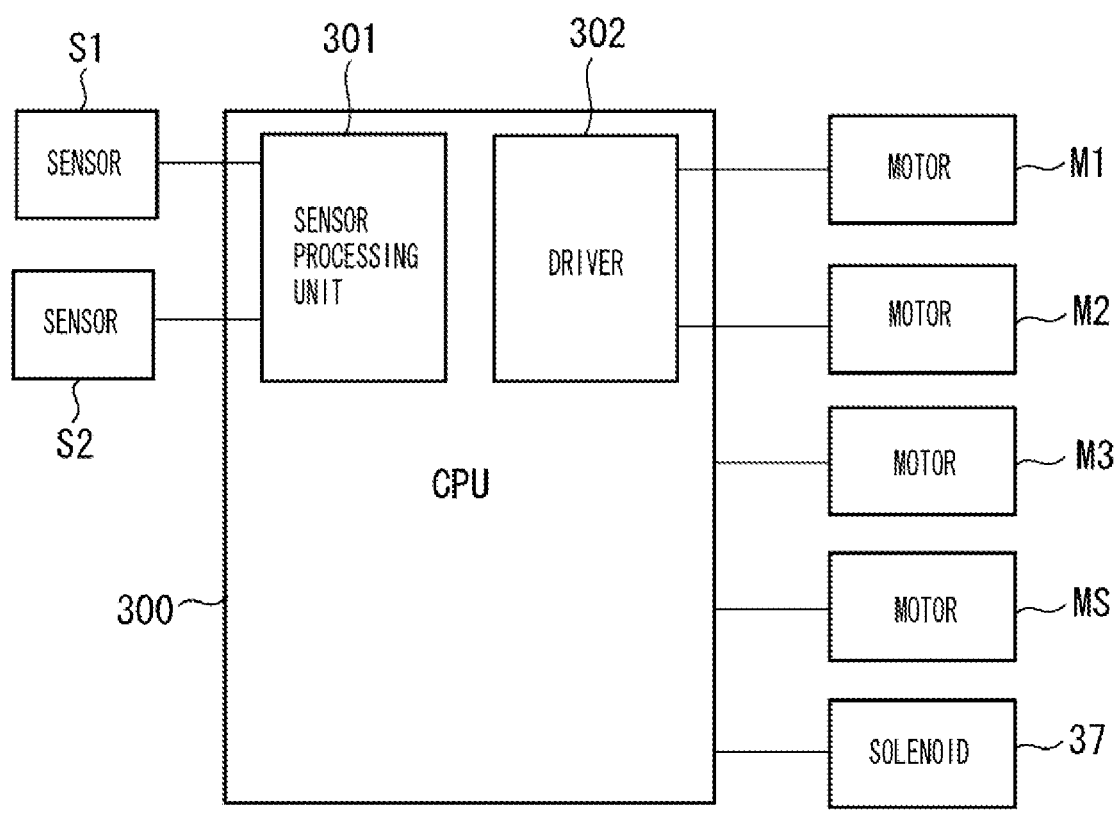
FIG. 4 illustrates a block diagram that controls the registration unit according to an exemplary embodiment of the present invention.

As shown in FIG. 3, a driven roller 33a of the conveyance roller pair 33 is movable between a solid line and a broken line by a motor MS shown in FIG. 4. Accordingly, the driven roller 33a can be separated from the drive roller 33b.

Above or below the area where the sheet is conveyed, skew detection sensors S1 and S2 are arranged. These sensors detect a sheet conveyed by the skew correction roller pairs 31 and 32. A sensor processing unit 301 amplifies a signal component detected by the skew detection sensors S1 and S2, performs A/D conversion, and inputs the converted signal into a central processing unit (CPU) 300 (serving as a control device) as detection information. The motor driver 302 separately drives the skew correction motors M1 and M2 based on a signal from the CPU 300. Further, a trailing edge detection sensor 34 in FIG. 2 is arranged to detect a trailing edge of the sheet conveyed by the conveyance roller pair 33.

Next, a basic skew correction operation of the skew correction roller pairs 31 and 32 of the registration unit 30 will be described.

First, the sheet is conveyed along a sheet path SP to the skew correction roller pairs 31 and 32 by the conveyance roller pair 33. If the leading edge of the sheet is skewed when the sheet reaches the skew detection sensors S1 and S2, timing in which the skew detection sensor S1 detects the sheet will be different from timing in which the skew detection sensor S2 detects the sheet. Next, the detection information is input into the CPU 300. Then, the CPU 300 calculates an amount of skew N based on the difference of the detection timing, sheet conveying speed, and a space between the skew detection sensors S1 and S2 which is known beforehand. In order to correct the calculated amount of skew N, the CPU 300 controls the motor driver 302 to accelerate or decelerate either or both of the skew correction motors M1 and M2. Then, the skew correction roller pairs 31 and 32 correct the skew by rotating the sheet owing to a difference of the driving speeds of the motors.

Next, a configuration is described in which a deflected sheet is formed between the skew correction roller pairs 31 and 32 and the conveyance roller pair 33.

Swinging guides 35 and 36 are arranged between the skew correction roller pairs 31 and 32 and the conveyance roller pair 33. The swinging guides 35 and 36 form a deflected sheet by projecting in the thickness direction of the sheet driven by a solenoid 37 while the sheet is conveyed. The swinging guide 35 serving as a deflection forming device is arranged so that it can project from beneath a sheet path SP.

The swinging guide 35 can move vertically while a downstream edge 35a of the swinging guide 35 pivots about a shaft 38 located upstream of the swinging guide 35 and driven by the solenoid 37. The swinging guide 35 can be rib-shaped as shown in a solid line located at the center of the registration unit 30 in FIG. 2, or plate-shaped as shown in a chain double-dashed line.

When placed in a waiting position shown in FIG. 3A, the swinging guide 35 projects above a guide plate 48 to guide the sheet. However, the swinging guide 35 can also wait beneath the guide plate 48 and cause the guide plate 48 to guide the sheet.

Also, a swinging guide 36 arranged above the swinging guide 35 so as to face the swinging guide 35, guides the top surface of the sheet. The swinging guide 36 pivots about a shaft 39 located downstream of the swinging guide 36 so that an upstream edge 36a can move vertically. The swinging guide 36 moves upward in accordance with an upward rotation of the swinging guide 35. The swinging guide 36 can be rotated by a drive unit such as a solenoid (not shown) so that it rotates at the same timing when the swinging guide 35 projects, or it can be linked to the rotation of the swinging guide 35.

The swinging guides 35 and 36 rotate so that their positions change from those shown in FIG. 3A to the positions shown in FIG. 3B. When the swinging guides 35 and 36 are in the positions shown in FIG. 3B, the flat sheet path SP is changed to a curved sheet path SPK that deflects the sheet. This deflection allows a twist of the sheet to occur during the skew correction. Accordingly, the skew can be corrected with high accuracy without reducing productivity.

Figure 5:
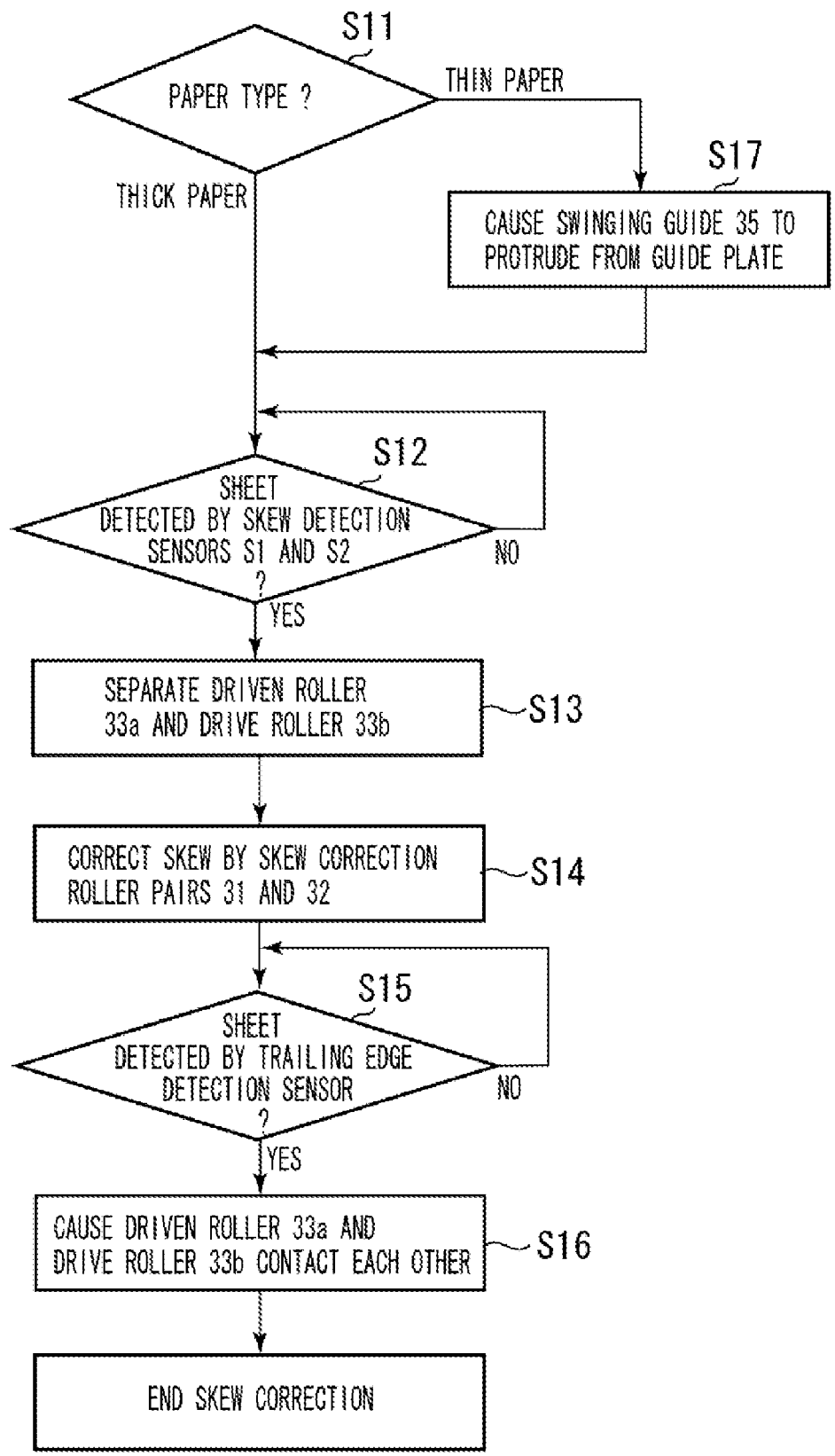
FIG. 5 is a flowchart describing a process of a skew correction by the registration unit according to an exemplary embodiment of the present invention.
Figure 6A:
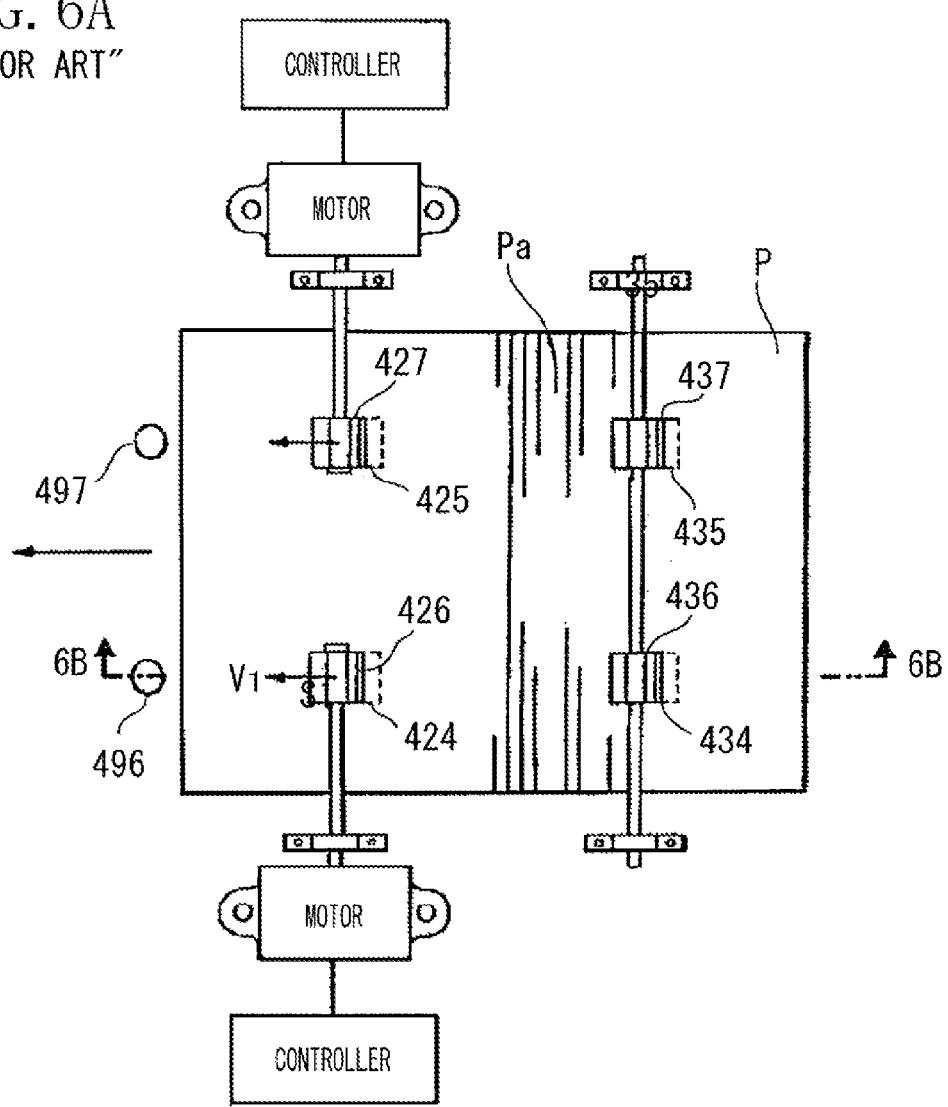
FIG. 6A is a plan view of a conventional sheet conveying apparatus.
Figure 6B:
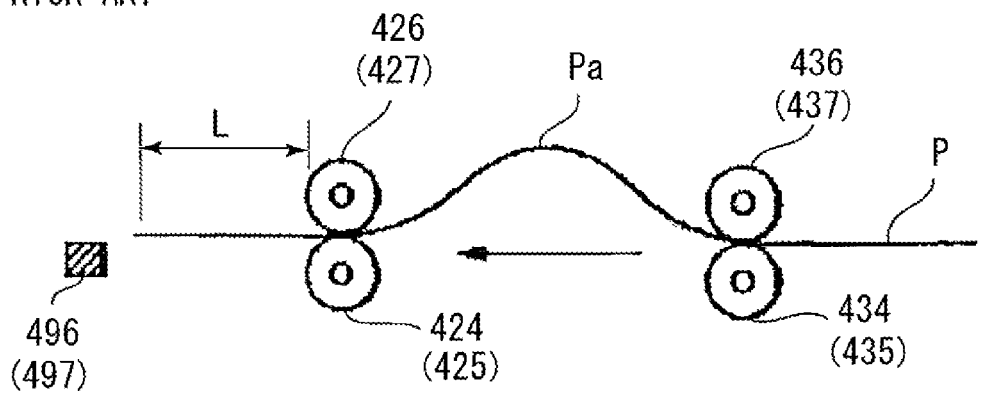
FIG. 6B is a cross-sectional view of the conventional sheet conveying apparatus taken along a line 6B-6B shown in FIG. 6A.

Next, an operation of the registration unit 30 is described according to a flowchart shown in FIG. 5.

First, operation of the registration unit 30 when it corrects the skew of thick paper (plain paper having stiffness over a predetermined value) or thick paper such as coated paper will be described.

First, a user (not shown) inputs a type of sheet such as thick paper or coated paper using an operation panel (step S11). Then the sheet is fed from the paper deck 10 (see FIG. 1) to the conveyance roller pair 33 by which the sheet is conveyed to the skew correction roller pairs 31 and 32. The sheet is further conveyed to a pair of skew detection sensors S1 and S2 where the leading edge of the sheet is detected (ON) (step S12).

When the sheet is nipped by the skew correction roller pairs 31 and 32, the driven roller 33a is separated from the drive roller 33b by the motor MS (step S13). The driven roller 33a is separated at a timing when a leading edge of the sheet is detected by the skew detection sensors S1 and S2. At this timing, the sheet is reliably nipped by the skew correction roller pairs 31 and 32.

The CPU 300 determines a direction of the skew and calculates the amount of skew N. According to control of the CPU 300, either or both of the skew correction motors M1 and M2 are accelerated or decelerated to correct the skew of the sheet (step S14). As a result, the skew of the sheet is corrected, and the sheet is conveyed to a transfer unit of the image forming unit 2.

When a sheet trailing edge detection sensor 34 detects (ON) a trailing edge of the skew-corrected sheet (step S15), the driven roller 33a and the drive roller 33b contact with each other by driving the motor MS (step S16). Then the rollers wait in a sheet-conveyable state.

Next, an operation of the registration unit 30 that corrects skew of plain paper having stiffness less than a given stiffness (hereinafter referred to as thin paper) will be described. The thin paper is, for example, paper whose grammage is less than approximately 50 g/m².

A user (not shown) inputs information that the sheet is thin paper using the operation panel (step S11). The sheet is delivered from the paper deck 10 (see FIG. 1) and conveyed to the conveyance roller pair 33. Further, the solenoid 37 allows the swinging guides 35 and 36 to rotate so that their positions change from those shown in FIG. 3A to the positions shown in FIG. 3B. The swinging guide 35 fully projects from the guide plate 48 to change the flat sheet path SP to a curved sheet path SPK (step S17).

The conveyance roller pair 33 conveys the sheet to the swinging guides 35 and 36. After the sheet is deflected by the swinging guides 35 and 36, the sheet is nipped at the skew correction roller pairs 31 and 32. It is to be noted that the deflection of the sheet is formed in a direction orthogonal (i.e., a width direction of the sheet) to the sheet conveyance direction. When the leading edge of the sheet is detected by a pair of skew detection sensors S1 and S2 (step S12), the driven roller 33a and the drive roller 33b are separated from each other by the motor MS (step S13).

The CPU 300 determines a direction of the skew and calculates the amount of skew N. According to a control of the CPU 300, either or both of the skew correction motors M1 and M2 are accelerated or decelerated to correct the skew while the sheet is deflected (step S14). As a result, the skew of the sheet is corrected and the sheet is conveyed to the image forming unit 2.

Then, when the sheet trailing edge detection sensor 34 detects a trailing edge of the skew-corrected sheet (ON) (step S15), the motor MS operates to press and bring together the driven roller 33a and the drive roller 33b (step S16), and the rollers wait in a sheet-conveyable state.

When paper having small stiffness such as thin paper is conveyed, the registration unit 30 rotates the swinging guides 35 and 36 so that the swinging guide 35 moves upward, and a curved path is formed. After the sheet is deflected, the sheet is conveyed to the skew correction roller pairs 31 and 32 where the skew is corrected.

Therefore, the registration unit 30 is able to correct a twist of the sheet caused by a difference of a sheet conveyance speed of the skew correction roller pairs 31 and 32 even if the sheet is thin paper, and thus reduce sheet damage by reducing paper crease, bend, or the like. In addition, unlike the conventional image forming apparatuses, productivity is not reduced since it is not necessary to decelerate the skew correction roller pairs 31 and 32.

According to the present exemplary embodiment, when a skew of a sheet having small stiffness is corrected, the swinging guide 35 fully projects from the guide plate 48 (see FIG. 3B) to make the curved sheet path SPK. This is because if the swinging guide 35 is not projected and the sheet surface-contacts the guide plate 48, great frictional resistance is applied to the sheet from the guide plate 48 when the sheet is rotated for skew correction. In such a case, if the sheet is stiff enough, the sheet can be rotated while keeping its form. However, if the sheet is not so stiff, the sheet can not be rotated reliably due to the frictional resistance applied to the sheet from the guide plate 48, and the sheet position can be disturbed during rotation. This would lead to a less-accurate skew correction when the sheet is not so stiff. Further, even if skew at the leading edge is corrected, the trailing edge may be conveyed with skew, and paper crease can appear.

In order to solve this problem, the swinging guides 35 and 36 are projected to form a deflected sheet before the skew is corrected when the sheet has small stiffness. Then, the area of the guide plate 48 and the swinging guide 35 that contact the sheet can be reduced. Thus, frictional resistance applied to the sheet can be reduced and the sheet can be reliably rotated at the time of skew correction.

According to the present exemplary embodiment, the driven roller 33a and the drive roller 33b are separated when a deflected sheet is formed to correct skew. However, it is not necessary to separate the driven roller 33a and the drive roller 33b since the twist made during the skew correction is allowed by the deflection of the sheet. Further, if the driven roller 33a and the drive roller 33b are not separated, the swinging guide 35 can return to the original position from the projected state after the sheet is deflected. In this case, since the conveyance speed of the conveyance roller pair 33 and the conveyance speed of the skew correction roller pairs 31 and 32 are almost equal, the sheet is conveyed keeping the deflection. As described above, also in this case, the frictional resistance applied to the sheet from the guide plate 48 is reduced and the sheet can be rotated reliably. The swinging guide 35 can be returned to the original position, for example, at a timing when the leading edge of the sheet is detected by the skew detection sensors S1 and S2.

Further, it is also possible to correct skew of a stiff sheet by forming a deflected sheet at the curved sheet path SPK by the projected swinging guide 35. However, a reaction force of the deflection becomes a convey resistance if the stiffness of the sheet is great. Furthermore, a force can be applied to the skew correction roller pairs 31 and 32 in a direction that leads the roller pairs to separate. This results in reducing the skew correction accuracy. Therefore, when skew of a relatively stiff sheet is corrected, it is useful to perform correction without making deflection on a curved sheet path.

Further, according to the aforementioned exemplary embodiment, thickness information of the sheet is input by a user via an operation panel. However, this information can also be acquired from a sheet thickness detection sensor arranged at the sheet conveying unit 20 upstream of the registration unit 30.

Furthermore, while the sensors configured to detect the amount of skew are placed downstream of the skew correction roller pairs in the present exemplary embodiment, such sensors can also be arranged upstream of the skew correction roller pairs. In this configuration, the skew can be corrected as soon as the sheet reaches the skew correction roller pairs. Therefore, the skew correction path section can be made shorter than the case where the skew correction path section is arranged downstream of the skew correction roller pairs 31 and 32. As a result, the image forming apparatus can be further down-sized.

In the aforementioned exemplary embodiment, the swinging guide 35 is projected from the guide plate 48 to form the curved sheet path SPK before the sheet reaches the skew correction roller pairs 31 and 32. However, the present invention is not limited to such a configuration.

For example, the swinging guide 35 can be fully projected from the guide plate 48 in a state that the driven roller 33a and the drive roller 33b motor MS are separated when the sheet reaches the skew correction roller pairs 31 and 32. In this manner, the sheet can be deflected. The skew can be corrected by the skew correction roller pairs 31 and 32 while the sheet has the deflection.

Also in this operation, the skew can be corrected in the state that the swinging guide 35 is projected as described above. Alternatively, after the sheet is deflected, the driven roller 33a and the drive roller 33b contact again with each other under pressure and the swinging guide 35 is returned to the original position. In this manner, the skew can also be corrected.

Further, the registration unit 30 of the present exemplary embodiment may not necessarily be arranged upstream of the transfer unit of the image forming apparatus but can be arranged upstream of a sheet processing apparatus that performs punching of a hole in the sheet so that precision of a hole position can be ensured.

Furthermore, the registration unit 30 according to the present exemplary embodiment can also be arranged upstream of a sheet processing apparatus that binds sheets so that precision of a binding position can be ensured.

In addition, the registration unit 30 according to the present exemplary embodiment can be adapted to an auto document feeder that automatically feeds a document having an image to an image scanning unit for scanning.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-216094 filed Aug. 8, 2006, which is hereby incorporated by reference herein in its entirety.

What is claimed is:

1. An image forming apparatus comprising:
    a conveying device configured to convey a sheet along a main sheet path, the sheet conveying device including a pair of conveyance rollers that can be separated;
    a skew correcting device configured to correct the skew of the sheet by rotating the sheet which is conveyed along the main sheet path by the conveying device;
    a deflection forming device arranged between the sheet conveying device and the skew correcting device and operable to project into the main sheet path to make a path for deflecting the sheet,
    wherein the skew of the sheet is corrected by the skew correcting device while the deflection of the sheet is formed by the deflection forming device;
    an image forming unit configured to form an image on the sheet having the skew corrected by the skew correcting device; and
    a control device configured to control the sheet conveying apparatus,
    wherein the skew correcting device corrects the skew of a sheet whose stiffness is less than a predetermined value, the deflection forming device is projected into the main sheet path, but the deflection forming device is not projected into the main sheet path and the pair of conveyance rollers are separated at the time the skew correcting device corrects the skew of the sheet when the stiffness of the sheet is equal to or greater than the predetermined value.

2. The sheet conveying apparatus according to claim 1, wherein the deflection forming device is projected into the main sheet path to form deflection of the sheet so as to be in a projecting position and then returned to an original position from the projecting position.

* * * * *